United States Patent
Kwon et al.

(10) Patent No.: US 10,321,453 B2
(45) Date of Patent: Jun. 11, 2019

(54) SYSTEM AND METHOD FOR ALLOCATING PERIODIC RESOURCES

(71) Applicant: FutureWei Technologies, Inc., Plano, TX (US)

(72) Inventors: Young Hoon Kwon, San Diego, CA (US); Yunsong Yang, San Diego, CA (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 88 days.

(21) Appl. No.: 13/925,365

(22) Filed: Jun. 24, 2013

(65) Prior Publication Data

US 2013/0343305 A1   Dec. 26, 2013

Related U.S. Application Data

(60) Provisional application No. 61/664,455, filed on Jun. 26, 2012.

(51) Int. Cl.
*H04W 52/02* (2009.01)
*H04W 72/04* (2009.01)
(Continued)

(52) U.S. Cl.
CPC ... *H04W 72/0426* (2013.01); *H04W 52/0216* (2013.01); *H04W 52/0219* (2013.01);
(Continued)

(58) Field of Classification Search
CPC ............ H04W 72/0426; H04W 74/04; H04W 52/0216; H04W 52/0219
(Continued)

(56) References Cited

U.S. PATENT DOCUMENTS 8,743,802 B2 *   6/2014   Anderson et al. ............ 370/329
8,768,323 B2 *   7/2014   Liu et al. ...................... 455/418
(Continued)

FOREIGN PATENT DOCUMENTS

CN   101374264 A   2/2009
CN   101577941 A   11/2009
(Continued)

OTHER PUBLICATIONS

Iternational Search Report of Patent Cooperation Treaty (PCT), International Application No. PCT/CN2013/077966, Applicant Huawei Technologies Co., Ltd., dated Oct. 3, 2013, 8 pages.
(Continued)

*Primary Examiner* — Mohammad S Anwar
(74) *Attorney, Agent, or Firm* — Slater Matsil, LLP

(57) ABSTRACT

A method for operating an access point includes broadcasting reservation information for a periodic group resource, assigning a resource in the periodic resource to a first station and transmitting information about the resource in the periodic group resource allocated to the first station to the first station, wherein the transmitting occurs during one of an association procedure with the first station and a reconfiguration of a resource assignment for the first station. The method also includes exchanging data with the first station during the resource in the periodic group resource allocated to the first station.

25 Claims, 8 Drawing Sheets

(51) Int. Cl.
*H04W 74/00* (2009.01)
*H04W 74/04* (2009.01)

(52) U.S. Cl.
CPC .......... *H04W 74/04* (2013.01); *H04W 74/006* (2013.01); *Y02D 70/142* (2018.01)

(58) Field of Classification Search
USPC ........................................ 370/329, 328, 338
See application file for complete search history.

(56) References Cited

U.S. PATENT DOCUMENTS

| | | | |
|---|---|---|---|
| 2003/0060207 A1 | 3/2003 | Sugaya et al. | |
| 2007/0298809 A1* | 12/2007 | So .............................. | 455/452.1 |
| 2008/0233967 A1* | 9/2008 | Montojo et al. ........... | 455/452.2 |
| 2009/0141692 A1* | 6/2009 | Kasslin ................ | H04W 48/16 370/338 |
| 2011/0194538 A1* | 8/2011 | Zheng et al. ................ | 370/335 |
| 2013/0128798 A1* | 5/2013 | Liu ....................... | H04W 48/12 370/312 |
| 2013/0229959 A1* | 9/2013 | Ghosh .................. | H04W 74/08 370/311 |
| 2013/0336245 A1* | 12/2013 | Fischer ................ | H04W 88/10 370/329 |
| 2016/0360483 A1 | 12/2016 | Liu et al. | |

FOREIGN PATENT DOCUMENTS

| | | | |
|---|---|---|---|
| EP | 1855424 | A1 | 5/2006 |
| JP | 2003060564 | A | 2/2003 |
| JP | 2009537083 | A | 10/2009 |
| JP | 2015502111 | A | 1/2015 |
| KR | 100961747 | B1 | 6/2010 |
| RU | 2010115573 | A | 10/2011 |

OTHER PUBLICATIONS

Cheong, M., "TGah Functional Requirements and Evaluation Methodology Rev. 5," IEEE P802.11 Wireless LANs, IEEE 802.11-09/00000905r5, Jan. 19, 2012, 20 pages.

"IEEE Standard for Information technology—Telecommunications and information exchange between systems Local and metropolitan area networks—Specific Requirements, Part 11: Wireless LAN Medium Access Control (MAC) and Physical Layer (PHY) Specifications," IEEE Std 802.11™-2012 (Revision of IEEE Std 802.11-2007) IEEE Computer Society, Sponsored by the LAN/MAN Standards Committee, Mar. 29, 2012, 2,793 pages.

Seok, Y., et al., "Uplink Channel Access General Procedure," IEEE 802.11-12/0831r0, Jul. 12, 2012, 19 pages.

Minyoung Park, "Proposed Specification Framework for TGah" IEEE 802.11-11/1137r6, Mar. 2012, pp. 1-13.

Young Hoon Kwon et al., "Periodic Channel Access" IEEE 802.11-12/1311r0, Nov. 12, 2012, 8 pages.

Young Hoon Kwon et al., "PRAW Follow Up" IEEE 802.11-13/0295r0, Mar. 18, 2013, 6 pages.

George Calcev, et al., IEEE 802.11-12-0610-00-00ah,"Non-TIM Stations in 11ah", IEEE, May 2012, 11 pages.

Chittabrata Ghosh, et al., IEEE 802.11-12/0843r0, "Restricted Access Window Signaling for Uplink Channel Access", IEEE, Jul. 16, 2012, 13 pages.

Hyoungjin Kwon, et al., IEEE 802.11-12/0867r0, "Non-TIM Allocation," IEEE, Jul. 16, 2012, 9 pages.

* cited by examiner

SYSTEM AND METHOD FOR ALLOCATING PERIODIC RESOURCES

This application claims the benefit of U.S. Provisional Application No. 61/664,455, filed on Jun. 26, 2012, entitled "System and Method for Periodic Resource Allocation," which application is hereby incorporated herein by reference.

TECHNICAL FIELD

The present disclosure relates generally to digital communications, and more particularly to a system and method for allocating periodic resources.

BACKGROUND

Currently, Task Group ah (TGah) of the IEEE 802.11 technical standards is operating on defining the local area network protocol, to be referred to as 802.11ah, with specific focus on sub 1 GHz carrier frequencies. Main requirements of TGah include a larger coverage area of up to 1 kilometer (km), a physical (PHY) layer data rate of at least 100 kilo bits per second (kbps), a maximum aggregate multi-station data rate of 20 mega bits per second (Mbps), the use of orthogonal frequency division multiplexing (OFDM) PHY modulation, and support for more than 2007 associations. However, overhead is a critical issue for 802.11ah. The PHY of 802.11ah uses a 10 times slower clock than the normal 802.11 protocol. Hence, each symbol is 10 times longer than in the normal 802.11 protocol. Efficiency of the protocol is thus important for 802.11ah.

SUMMARY OF THE DISCLOSURE

Example embodiments of the present disclosure which provide a system and method for allocating periodic resources.

In accordance with an example embodiment of the present disclosure, a method for operating an access point is provided. The method includes reserving, by the access point, resources for a periodic group resource, and broadcasting, by the access point, reservation information for the periodic group resource. The method also includes assigning, by the access point, a resource in the periodic resource to a first station; and transmitting, by the access point, information about the resource in the periodic group resource assigned to the first station to the first station, wherein the transmitting occurs during one of an association procedure with the first station and a reconfiguration of a resource assignment for the first station. The method further includes exchanging, by the access point, data with the first station during the resource in the periodic group resource assigned to the first station.

In accordance with another example embodiment of the present disclosure, a method for operating a station is provided. The method includes receiving, by the station, reservation information for a periodic group resource, and receiving, by the station, a list of allowed stations permitted to utilize an access window. The method also includes determining, by the station, if the station is in the list of allowed stations permitted to utilize the access window, exchanging, by the station, data with an access point within the access window if the station is in the list of allowed stations permitted to utilize the access window, and exchanging, by the station, data with the access point using a resource not reserved for the periodic group resource and not in the access window if the station is not in the list of allowed stations.

In accordance with another example embodiment of the present disclosure, an access point is provided. The access point includes a transmitter, and a processor operatively coupled to the transmitter. The transmitter broadcasts reservation information for a periodic group resource, and transmits information about a resource in the periodic group resource allocated to a first station to the first station, wherein the transmitting occurs during one of an association procedure with the first station and a reconfiguration of a resource assignment for the first station. The processor assigns the resource in the periodic resource to the first station, and exchanges data with the first station during the resource in the periodic group resource allocated to the first station.

In accordance with another example embodiment of the present disclosure, a station is provided. The station includes a receiver, and a processor operatively coupled to the receiver. The receiver receives reservation information for a periodic group resource, and receives a list of allowed stations permitted to utilize an access window. The processor determines if the station is in the list of allowed stations permitted to utilize the access window, exchanges data with an access point within the access window if the station is in the list of allowed stations permitted to utilize the access window, and exchanges data with the access point using a resource not reserved for the periodic group resource and not in the access window if the station is not in the list of allowed stations.

In accordance with another example embodiment of the present disclosure, a method for operating an access point is provided. The method includes reserving, by the access point, resources of a communications channel for a periodic restricted access window, and periodically broadcasting, by the access point, one of a Beacon frame, a short Beacon frame, and a Probe Response frame including reservation information about the periodic restricted access window. The method also includes transmitting, by the access point, a management frame to a first station during one of an association procedure and a rescheduling of a resource assignment to the first station, the management frame including information about a resource in the periodic restricted access window assigned to the first station, and exchanging, by the access point, data with the first station during the resource in the periodic restricted access window assigned to the first station.

One advantage of an embodiment is that long sleep stations do not need to periodically wake up to listen for resource allocations, thereby extending their battery life.

A further advantage of an embodiment is that regular stations are informed regarding resources allocated to the long sleep stations, so packet collisions are reduced.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to allocating periodic resources. For example, an access point broadcasts reservation information for a periodic group resource, and assigns a resource in the periodic resource to a first station. The access point also transmits information about the resource in the periodic group resource assigned to the first station to the first station, wherein the transmitting occurs during one of an association procedure with the first station and a reconfiguration of a resource assignment for the first station, and exchanges data with the first station during the resource in the periodic group resource assigned to the first station.

As another example, a station receives information for a periodic group resource, and receives a list of allowed stations permitted to utilize an access window. The station also determines if the station is in the list of allowed stations permitted to utilize the access window, and exchanges data with an access point within the access window if the station is in the list of allowed stations permitted to utilize the access window, and exchanges data with the access point using a resource not reserved for the periodic group resource and not in the access window if the station is not in the list of allowed stations.

The present disclosure will be described with respect to example embodiments in a specific context, an IEEE 802.11 TGah compliant communications system that supports resource allocations for both regular stations and long sleep stations. The disclosure may also be applied, however, to other standards compliant, such as The Third Generation Partnership Project (3GPP) or other 802.11 technical standards, and non-standards communications systems that support resource allocations for regular stations and long sleep stations.

Figure 1:
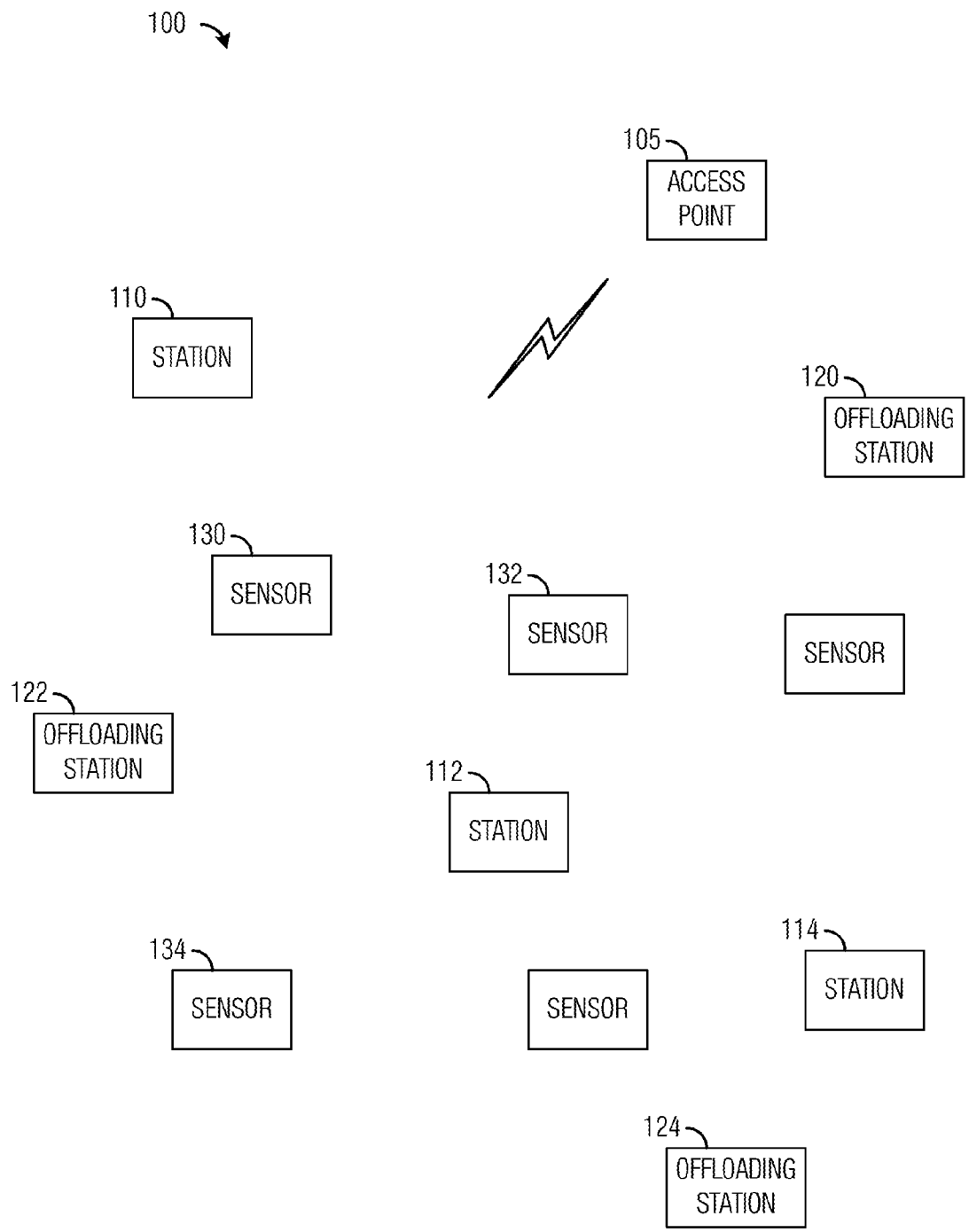
FIG. 1 illustrates an example communications system according to example embodiments described herein.

FIG. 1 illustrates a communications system 100. It is noted that communications system 100 may also be referred to as a wireless LAN (WLAN) basic service set (BSS). Communications system 100 includes an access point (AP) 105, an example of a communications controller, serving a plurality of stations (an example of communications devices). The plurality of stations may include typical stations, such as stations 110 through 114, and may include personal computers, laptops, tablets, multi-media servers, and the like. The plurality of stations may also include offloading stations, such as offloading stations 120 through 124, and may include stations that typically access services through other access networks. Examples offloading stations include cellular telephones, user equipment, and the like. The plurality of stations may also include sensors, such as sensors 130 through 134. In general, sensors are used to gather information, such as weather information, security information, position information, health information, safety information, performance information, and the like. The sensors may transmit the information through access point 105 to a server or an information aggregator. The sensors may also aggregate the information prior to transmitting the information. Some of the stations, such as the sensors, may be low duty cycle stations, spending a majority of their time in a reduced power state and communicating only sporadically with access point 105. The low duty cycle stations may be termed long sleep stations (LSS).

While it is understood that communications systems may employ multiple access points capable of communicating with a number of stations, only a limited number of access points and stations are illustrated for simplicity.

Figure 2:
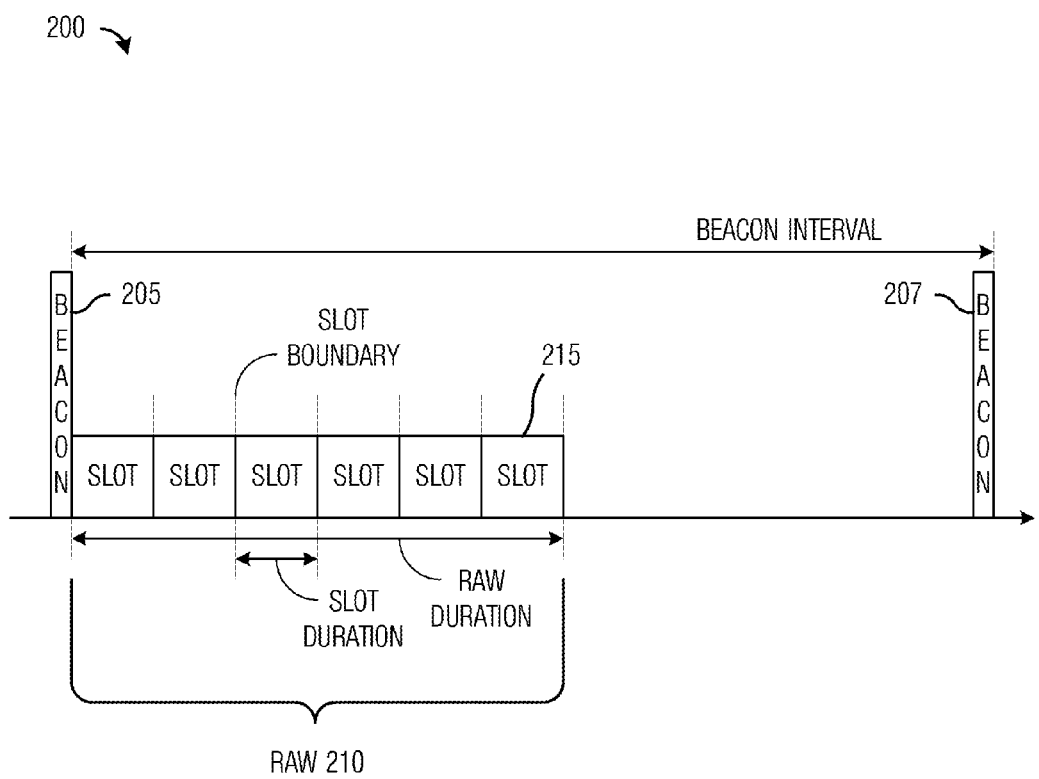
FIG. 2 illustrates an example diagram of a beacon interval highlighting a RAW according to example embodiments described herein.

The concept of a restricted access window (RAW) is proposed in IEEE 802.11 TGah to save power in stations and to increase communications channel efficiency. FIG. 2 illustrates a diagram of a beacon interval 200 highlighting a RAW. Beacon interval 200 comprises a span of resources between a first (short) beacon frame 205 and a second (short) beacon frame 207. It is noted that a beacon interval may also comprise a span of resources between two consecutive (short) beacon frames, e.g., between two consecutive short beacon frames, between a short beacon frame and a beacon frame, between a beacon frame and a short beacon frame, and the like. In general, the term (short) beacon may be used to refer to either a beacon or a short beacon. However, in situations when the use of the term (short) beacon leads to ambiguity, either beacon or short beacon will be used to resolve ambiguities. Within beacon interval 200 there may be defined one or more RAWs, such as RAW 210, with a finite duration. The RAWs in a beacon interval may have the same duration or may have different durations. Each RAW may be divided into a plurality of time slots. As an example, RAW 210 may be divided into six slots, such as slot 215. Typically, the slots within a single RAW have equal duration. However, slots within different RAWs may have different durations.

Generally, a station wakes up at a target beacon transmission time (TBTT) and listens for a (short) beacon frame that includes an indication of a slot duration for each RAW within a corresponding beacon interval. The station may determine its assigned slot, which is assigned by an access point serving the station. After determining its assigned slot, the station may return to its reduced power state (such as a sleep state) only to awaken prior to its assigned slot. The station may access the communications channel at the slot boundary of its assigned slot utilizing an enhanced distributed channel access (EDCA) technique. It is noted that the EDCA technique is beyond the scope of the example embodiments and will not be discussed further herein.

Generally, an access point may allocate a RAW at each beacon interval and transmit information regarding the RAW to its station in a (short) beacon frame transmitted at the beginning of the beacon interval. Additionally, the number and/or size of the RAWs per beacon interval may change. Therefore, the stations of the access point need to receive the (short) beacon frames to locate the RAW(s) within each beacon interval. For stations that have very short duty cycles, i.e., stations that sleep for an extended period of time and only wake up occasionally to exchange data, the constant need to wake and receive (short) beacon frames can dramatically increase their power consumption and therefore, shorten their battery life. These stations may be referred to hereinafter as long sleep stations (LSS). Examples of LSS may include sensors and some of the battery powered stations. Stations that do not have short duty cycles may be referred to as regular stations.

A technique for allocating resources to long sleep stations is to allocate a designated time slot(s) to a long sleep station that may be used for data exchanges involving the long sleep station when the long sleep station associates with the access point. It is noted that the resource allocation is a long term resource allocation and the long sleep station may not need to listen to the (short) beacon frames because it already knows its resource allocation. With a long term resource allocation, indicating the resource allocation in (short) beacon frames may not be efficient since the long sleep stations are not likely to be listening to the (short) beacon frames. However, since the resources may be shared by every station, if the resource allocations are not indicated in the (short) beacon frames, packet collisions between long sleep stations (which know about the resource allocations) and regular stations (which do not know about the resource allocations) may occur.

According to an example embodiment, it may not be necessary for regular stations to know actual resource assignments for the long sleep stations as long as the regular stations know that a resource has been assigned to a long sleep station and that the regular stations should not utilize the resource. In other words, a regular station does not need to know the identity of a long sleep station that has been assigned to use a resource, it simply needs to know that the resource has been allocated to a long sleep station.

According to an example embodiment, a periodic restricted access window (PRAW) is provided. Information regarding resources assigned to a PRAW may be broadcasted once in a long while, for example, once per beacon frame. Since a PRAW is periodic by definition, there is no need to broadcast information regarding resources assigned to the PRAW before each instance of the PRAW, i.e., at every (short) beacon frame. Instead, the information regarding resources assigned to the PRAW may need to be broadcast as few times, such as when the PRAW is initiated and/or when changes are made to the PRAW. However, since regular stations constantly enter and/or leave a communications system, a more regular broadcast of the information regarding resources assigned to the PRAW may help to ensure that the regular stations are informed about the resources assigned to the PRAW.

An actual assignment of a slot in a PRAW to a long sleep station may be indicated to the long sleep station during a management procedure, such as during an association procedure, a reassociation procedure, a probe procedure, and the like. In general, a management procedure may be defined as an exchange of management frames, such as probe request frames, probe response frames, association request frames, association response frames, authentication frames, deauthentication frames, reassociation request frames, reassociation response frames, disassociation frames, beacon frames, public action frames (e.g., generic advertisement service (GAS) initial request frames, GAS initial response frames, GAS comeback request frames, and GAS comeback response frames), and the like.

Since every station served by the access point knows about the PRAW (either through the information regarding resources assigned to the PRAW broadcast by the access point or through an actual assignment made using a management procedure), the stations may not access the PRAW unless it is allowed to do so by the access point even if the assignments of the resources of the PRAW are not broadcast at every short beacon interval.

According to an example embodiment, periodic resources within a beacon duration (an interval between two consecutive beacon frames) may be allocated to long sleep stations. Such an allocation may help to provide uplink and/or downlink packet transmissions with higher communications channel efficiency, less signaling overhead, as well as lower power consumption. Furthermore, a hidden node problem for packet transmission where one station may not be able to detect transmissions made by another station may be avoided. Additionally, devices with wide ranging capability, such as smart phones, tablets, sensors, printers, displays, and the like, may be capable of implementing the example embodiments.

Figure 3:
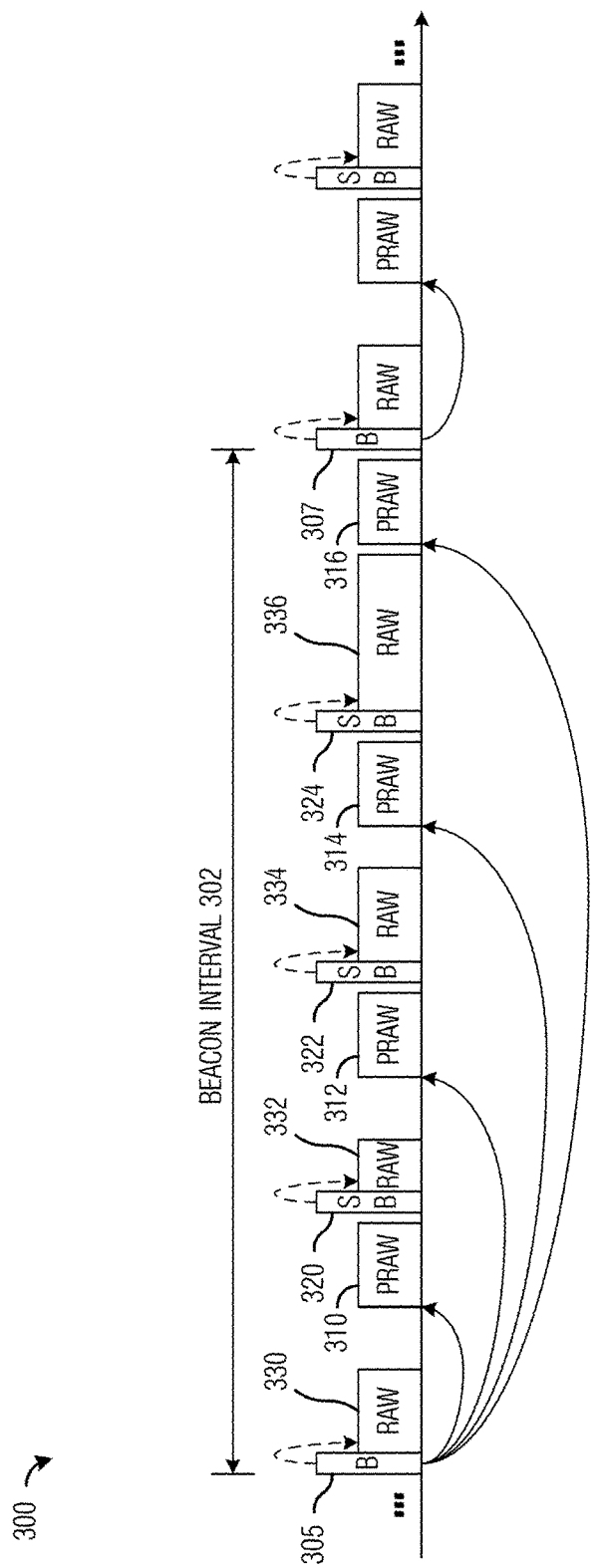
FIG. 3 illustrates an example diagram highlighting PRAW and RAW coexistence according to example embodiments described herein.

FIG. 3 illustrates a diagram 300 highlighting PRAW and RAW coexistence. As shown in FIG. 3, a beacon interval 302 spans a first beacon frame 305 and a second beacon frame 307. First beacon frame 305 includes information regarding resources assigned to a PRAW with period equal to a short beacon interval, illustrated as PRAW 310, PRAW 312, PRAW 314, and PRAW 316. It is noted that the PRAWs have the same duration. It is also noted that the PRAW shown in FIG. 3 are intended as an example of PRAWs and that other PRAW configurations are possible. As an example, a PRAW may be configured with a period equal to two short beacon intervals. If such a configuration was used and with PRAW 310 being an initial PRAW, then PRAW 312 and PRAW 316 would be non-existent. It is further noted that multiple PRAWs may be defined and the illustration and discussion of a single PRAW should not be construed as being limiting to the scope or the spirit of the example embodiments.

First beacon frame 305 also includes information regarding resources assigned to RAW 330. As shown in FIG. 3, beacon interval 302 spans 4 short beacon intervals and other short beacon frames, such as short beacon frame 320, short beacon frame 322, and short beacon frame 324 include information regarding resources assigned to RAW 332, RAW 334, and RAW 336. It is noted that since the RAWs are individually defined by information carried in a respective short beacon frame (or beacon frame), the RAWs may have different durations, number of slots, slot duration, and the like. It is also noted that the access point allocates resources to the RAWs that are not part of the PRAW.

It is noted that the information regarding resources assigned to a PRAW being broadcast in beacon frames is an illustrative example for discussion purposes. The information regarding resources assigned to a PRAW may be broadcast in other messages and/or with different periodicities. As an example, the information regarding resources assigned to a PRAW may be broadcast in every second beacon frame, every third beacon frame, every N short beacon frames, where N is an integer number generally greater than 1, and the like.

Figure 4:
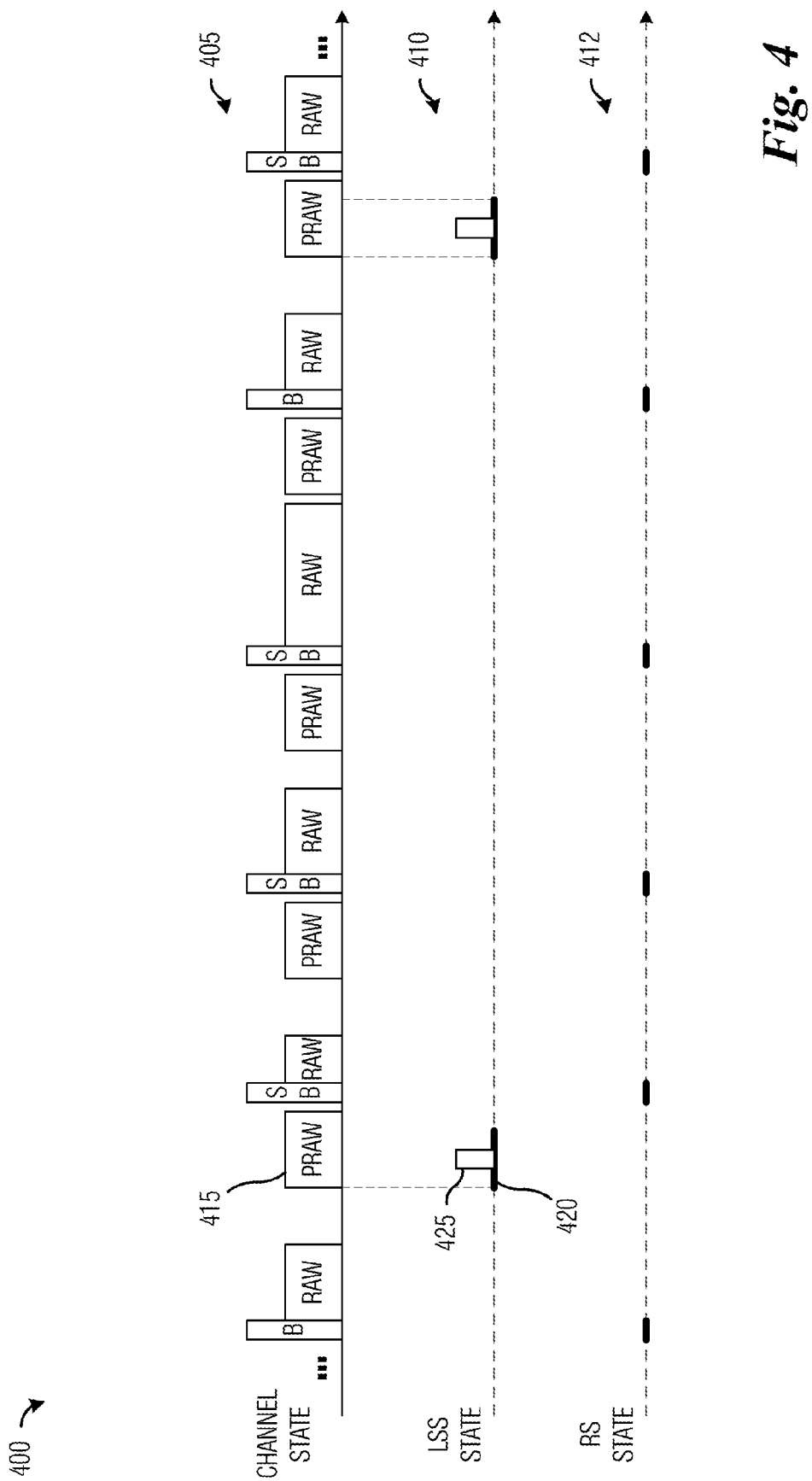
FIG. 4 illustrates an example diagram highlighting channel access by a long sleep station according to example embodiments described herein.

FIG. 4 illustrates a diagram 400 highlighting channel access by a long sleep station. As shown in FIG. 4, an access point has assigned some resources to a PRAW with period equal to a beacon interval. A first trace 405 illustrates (short) beacons, PRAW and RAW resources, a second trace 410 illustrates state of the long sleep station, and a third trace 412 illustrates state of a regular station. For discussion purposes, consider a situation where the long sleep station has been assigned a resource in PRAW 415. At a time corresponding to the resource in PRAW 415 (or slightly before the time), the long sleep station may wake up from a reduced power state (the reduced power state is shown as a dashed line and the wake up state is shown as a thick line) and access the communications channel (shown as block 425). For the regular station, it wakes up at every (short) beacon frame, i.e., both short beacon frames and beacon frames, to determine if it is allowed to exchange data in a RAW defined from resources in the beacon interval (the reduced power state is shown as a dashed line and the wake up state is shown as a thick line).

Figure 5:
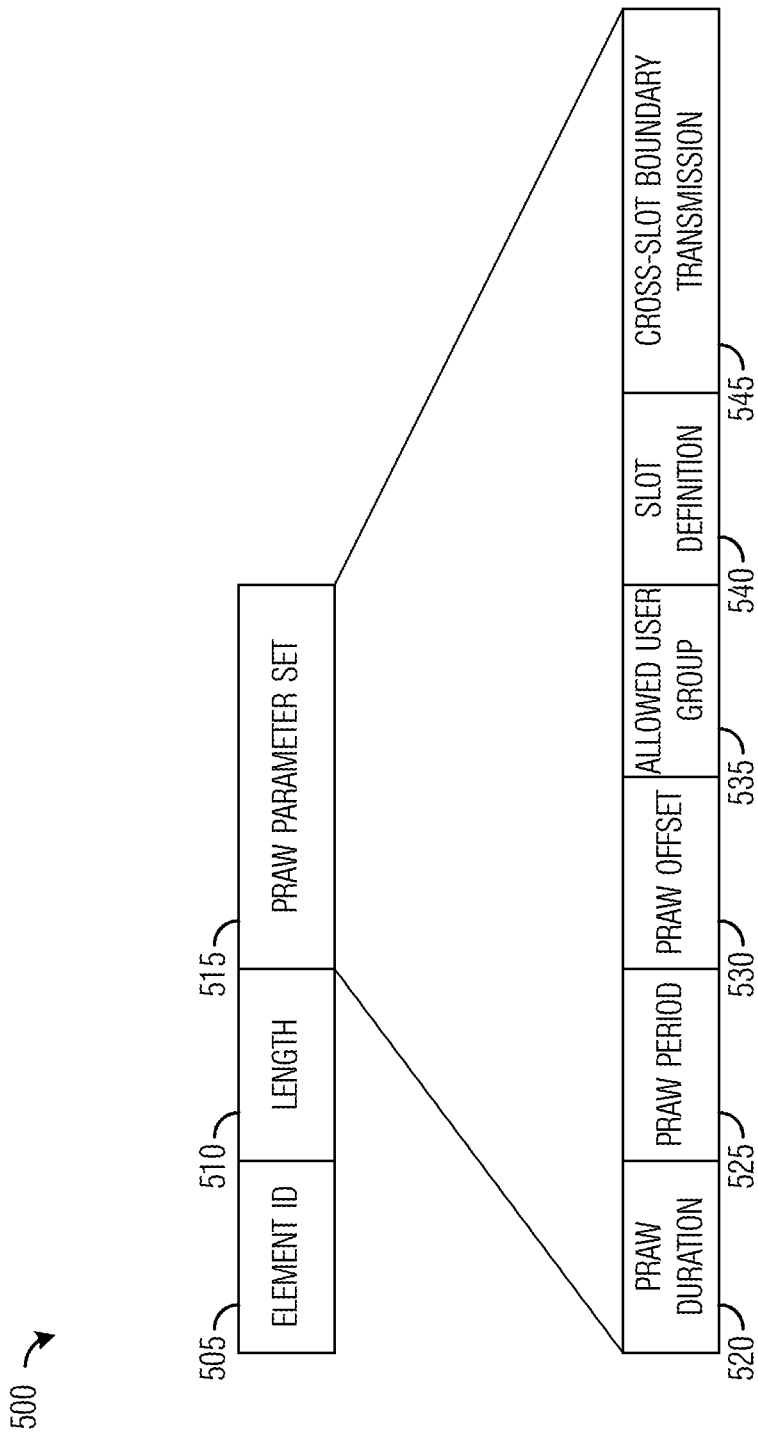
FIG. 5 illustrates an example PRAW allocation message according to example embodiments described herein.

FIG. 5 illustrates an example PRAW allocation message 500. PRAW allocation message 500 may be included in a beacon frame or a management frame as an information element, for example. PRAW allocation message 500 may include an element identifier ("element ID") field 505 which identifies the type of message. A length field 510 may specify a length of PRAW allocation message 500 and a PRAW parameter set 515 specifies a PRAW. It is noted that PRAW allocation message 500 may specify multiple PRAWs. In such a situation, PRAW allocation message 500 may include multiple PRAW parameter sets with each PRAW parameter set specifying a single PRAW.

PRAW parameter set 500 may include a PRAW duration field 520 specifying a duration of the PRAW in each interval, in a number of milliseconds or a number of slots, for example. A PRAW period field 525 specifying a period of the PRAW occurrences, and a PRAW offset field 530 specifying an offset, which may be a time to a first PRAW. PRAW parameter set 500 may include an allowed user group field 535 specifying which stations have access to the PRAW, a slot definition field 540 specifying slot parameters such as slot duration, number of slots, and the like, and a cross-slot boundary transmission field 545 specifying whether or not cross-slot boundary transmissions are permitted.

According to an example embodiment, the PRAW allocation can be broadcasted in every beacon period or at the time of (re)association, by using the Association Response, Reassociation Response, Probe Response frames, and the like For each long sleep station, specific slot allocation within the PRAW can be assigned during (re)association, for example. The PRAW allocation may not need to be broadcast at each short beacon frame. At each (short) beacon period, the access point may allocate a RAW(s) outside of the allocated PRAW resource. Those stations that do not have the access to the PRAW are not allowed to access resources of the PRAW, even though PRAW is not indicated at short beacon frames. Within PRAW, EDCA-based operation can be used for each allowed station to access the channel during the PRAW. PRAW allocation updates can be indicated in beacon frame transmitted by the access point.

When PRAW allocation update or modification is needed, the access point can indicate at every short beacon frame that beacon information has been updated. Increasing the "Change counter" in the short beacon is one option for indicating this event, for example. As an illustrative example, if the "Change counter" in the short beacon is increased, each station listens to the beacon frame or sends an inquiry message to the access point to check the updated information regarding the PRAW.

Figure 6:
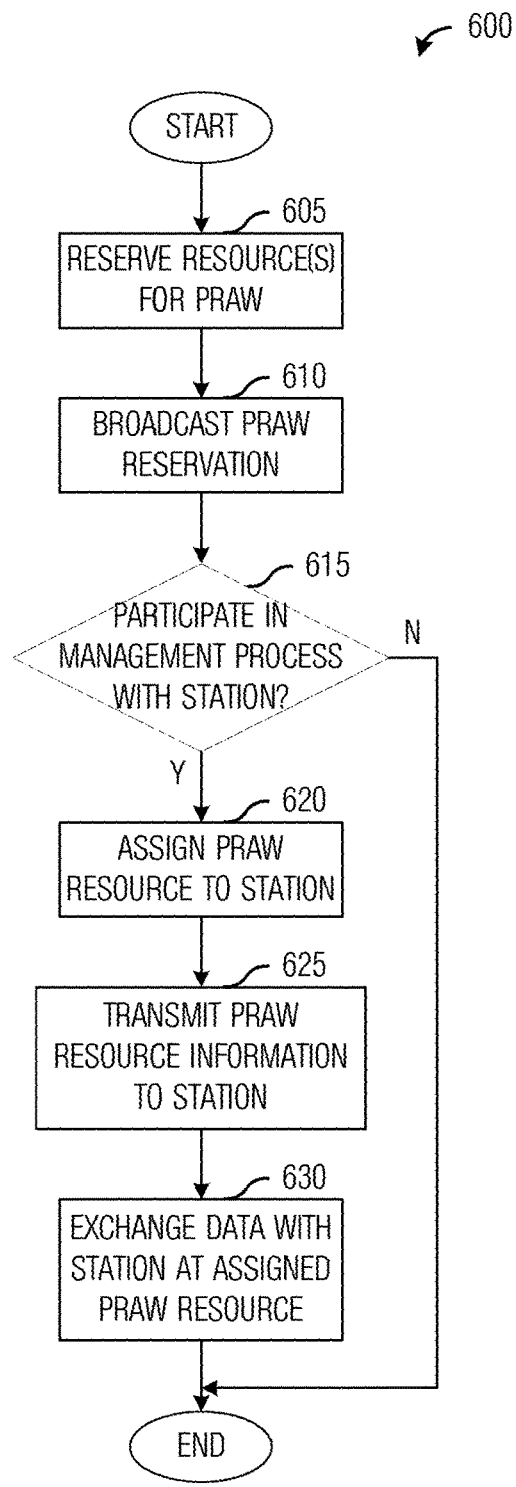
FIG. 6 illustrates an example flow diagram of operations occurring in an access point as the access point exchanges data with a station using a PRAW according to example embodiments described herein.

FIG. 6 illustrates a flow diagram of operations 600 occurring in an access point as the access point exchanges data with a station using a PRAW. Operations 600 may be indicative of operations occurring in an access point, such as access point 105, as the access point exchanges data with a station using a PRAW.

Operations 600 may begin with the access point reserving (or altering an existing reservation of) resources for a PRAW (block 605). The reservation of resources for the PRAW may also include specifying parameters of the PRAW. As an example, the access point may specify a duration of the PRAW, a number of slots in the PRAW, a time to the PRAW, which stations have access to the PRAW, and the like. It is noted that a duration of the PRAW, a number of slots in the PRAW, a time to the PRAW, which stations have access to the PRAW, and the like, may be examples of PRAW parameters. The access point may broadcast information about the PRAW reservation (block 610). The information about the PRAW reservation may include a number of slots in the PRAW, as well as a duration of each slot. The information about the PRAW reservation may also include information about stations that are allowed access to the PRAW. As an example, the information about the PRAW reservation may include one or more of a group identifier of the periodic restricted access window, a start time of the periodic restricted access window, a duration of the periodic restricted access window, a periodicity of the periodic restricted access window, and a start offset of the periodic restricted access window. The access point may broadcast the information in a beacon frame, for example. Alternatively, the access point may send the information in a management frame (of which a beacon frame is an example and other examples of management frames include probe request frames, probe response frames, association request frames, association response frames, authentication frames, deauthentication frames, reassociation request frames, reassociation response frames, disassociation frames, public action frames (e.g., generic advertisement service (GAS) initial request frames, GAS initial response frames, GAS comeback request frames, and GAS comeback response frames), and the like) or broadcast the information once in every N beacon frames, where N is an integer number generally greater than 1.

The access point may perform a check to determine if it is participating in a management process with a station (block 615). As discussed previously, a management process may involve the exchange of management frames with the station. Examples of management frames may include probe request frames, probe response frames, association request frames, association response frames, authentication frames, deauthentication frames, reassociation request frames, reassociation response frames, disassociation frames, beacon frames, public action frames (e.g., generic advertisement service (GAS) initial request frames, GAS initial response frames, GAS comeback request frames, and GAS comeback response frames), and the like.

If the access point is participating in a management process with the station, the access point may assign a resource(s) in the PRAW to the station (block 620). It is noted that the assignment of the resource(s) of the PRAW to the station may depend on the type of the station. As an example, the assignment may take place only if the station is a long sleep station. Otherwise, the access point may assign a resource in a RAW to the station. Alternatively, the access point may adjust an existing assignment to the station. The access point may transmit information about the assigned resource(s) of the PRAW to the station (block 625). The information about the assigned resource(s) may be included in a management frame transmitted to the station. The information about the assigned resource(s) may include a start time of the assigned resource(s), a duration of the assigned resource(s), and a period of the assigned resource(s). The management frame transmitted by the access point may also include the information about the PRAW reservation. The access point may exchange data with the station at the assigned resource(s) of the PRAW (block 630). If the access point is not participating in a management process with the station, operations 600 may terminate.

With respect to access point operation, considering the traffic amount from long sleep stations, an access point may once in a while allocate and/or reallocate periodic resource(s) for long sleep stations and indicate the resource allocation as PRAW allocation. The access point may allocate a long sleep station a resource within the PRAW. Specific resource allocation for each individual long sleep station within the PRAW can be indicated separately when a long sleep station associates or when resource allocation modification occurs. The access point may include PRAW allocation information in the beacon frame and may not include the PRAW allocation information in the short beacon frame. Alternatively, the access point may include PRAW allocation information once in every N short beacon frames, wherein N is greater than or equal to 1. When a long sleep station transmits and/or receives a packet to and/or from the access point, the access point may further allocate the long sleep station's next allowed time window within PRAW in a sequential manner, for example.

Figure 7:
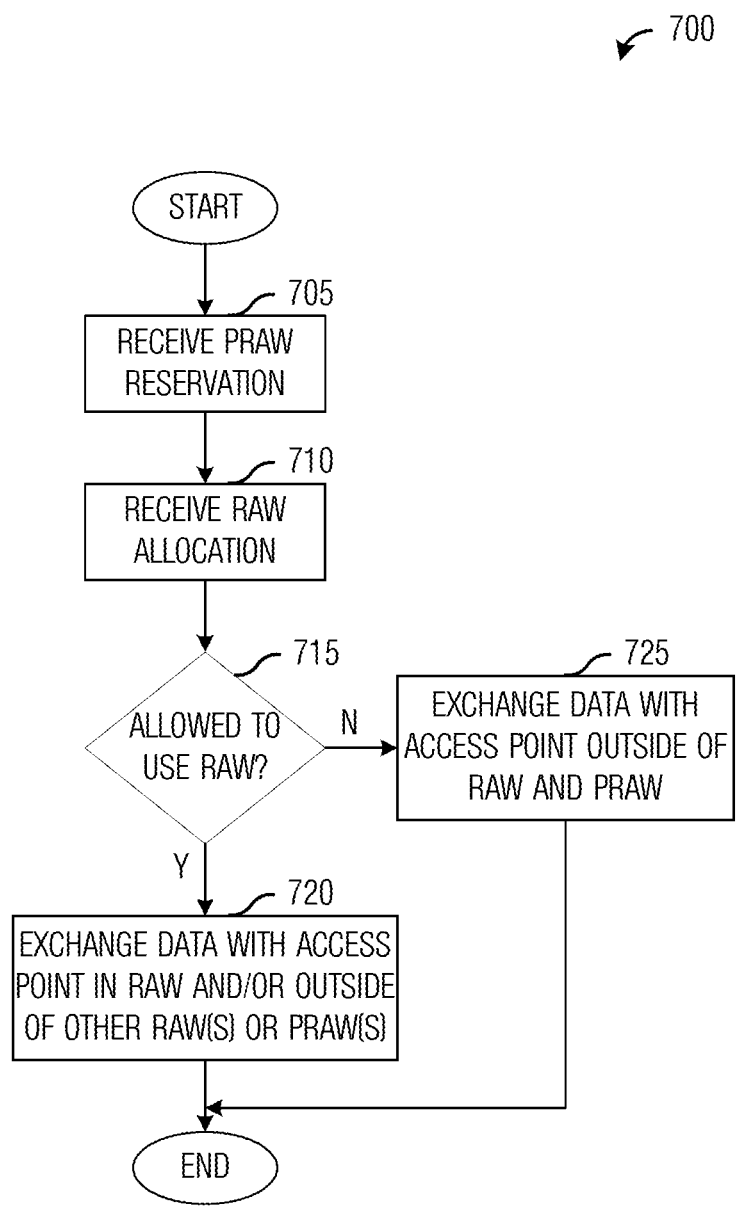
FIG. 7 illustrates an example flow diagram of operations occurring in a regular station operating in a communications system with support for both PRAWs and RAWs according to example embodiments described herein.

FIG. 7 illustrates a flow diagram of operations 700 occurring in a regular station operating in a communications system with support for both PRAWs and RAWs. Operations 700 may be indicative of operations occurring in a regular station as the regular station operates in a communications system with support for both PRAWs and RAWs.

Operations 700 may begin with the regular station receiving information about a PRAW reservation (block 705). As discussed previously the regular station may receive the information about the PRAW reservation in a beacon frame broadcast by an access point serving the regular station. Alternatively, the regular station may receive the information about the PRAW allocation in a management frame (of which a beacon frame is an example and other examples of management frames include probe request frames, probe response frames, association request frames, association response frames, authentication frames, deauthentication frames, reassociation request frames, reassociation response frames, disassociation frames, public action frames (e.g., generic advertisement service (GAS) initial request frames, GAS initial response frames, GAS comeback request frames, and GAS comeback response frames), and the like) transmitted by the access point. The PRAW reservation may include information such as a duration of the PRAW, a number of slots in the PRAW, a duration of the slots in the PRAW, a time to the PRAW, which stations have access to the PRAW, and the like. The regular station may receive information about a RAW allocation (block 710). The information about the RAW allocation may be received in a beacon frame broadcast by the access point. The information about the RAW allocation may include information about stations allowed to access resources of the RAW.

The regular station may perform a check to determine if it is allowed to use the RAW (block 715). As discussed previously, potentially not every station served by the access point is allowed to use the RAW. The access point may be able to specify which stations have access to the RAW. If the regular station is allowed to use the RAW, the regular station may exchange data with the access point during the RAW and/or with resources that are outside of other RAW(s) or PRAW(s) (block 720). If the regular station is not allowed to use the RAW, the regular station may exchange data with the access point utilizing resources that are not part of the RAW, as well as PRAW(s) and/or other RAW(s) (block 725). As an example, the regular station may utilize established communications channel access methods in resources that are not allocated for RAWs and PRAWs.

With respect to station operation, when a station associates with the access point, or when it receives (short) beacon frames, it can identify PRAW information, which includes at least an allowed user group, PRAW resource start and/or end time information, and periodicity of PRAW allocation. If the station is not included in the "allowed user group" of a PRAW, the station is not allowed to send a packet within the PRAW time period, even though the PRAW information is not broadcasted at every short beacon frame. If the station is included in the "allowed user group" of the PRAW, the station is allowed to send a packet within the PRAW. Specific resource allocation for the station within the PRAW can be indicated using another message at the time of (re)association and/or when resource allocation modification is performed.

Figure 8:
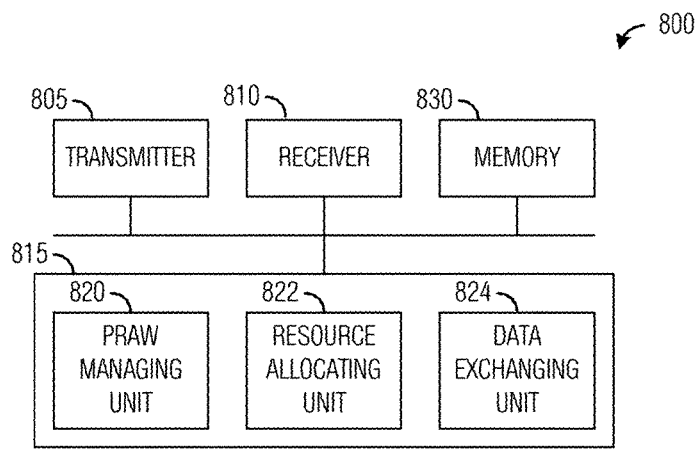
FIG. 8 illustrates an example first communications device according to example embodiments described herein.

FIG. 8 illustrates a first communications device 800. Communications device 800 may be an implementation of an access point, a communications controller, a base station, and the like. Communications device 800 may be used to implement various ones of the embodiments discussed herein. As shown in FIG. 8, a transmitter 805 is configured to transmit beacon frames, (short) beacon frames, PRAW and/or RAW allocation information, and the like. Communications device 800 also includes a receiver 810 that is configured to receive management frames, data, and the like.

A PRAW managing unit 820 is configured to determine resources to be reserved for a PRAW, determine PRAW parameters, and the like. PRAW managing unit 820 is configured to generate information to indicate PRAWs, and the like. A resource allocating unit 822 is configured to assign resources of PRAWs to stations. Resource allocating unit 822 is configured to generate information to indicate the assigned resources. A data exchanging unit 824 is configured to exchange data with a station. A memory 830 is configured to store PRAW resource reservations, PRAW parameters, PRAW indications, PRAW resource assignments, PRAW resource indications, data, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while PRAW managing unit 820, resource allocating unit 822, and data exchanging unit 824 may be software modules executing in a microprocessor (such as processor 815) or a custom circuit or a custom compiled logic array of a field programmable logic array. PRAW managing unit 820, resource allocating unit 822, and data exchanging unit 824 may be modules stored in memory 830.

Figure 9:
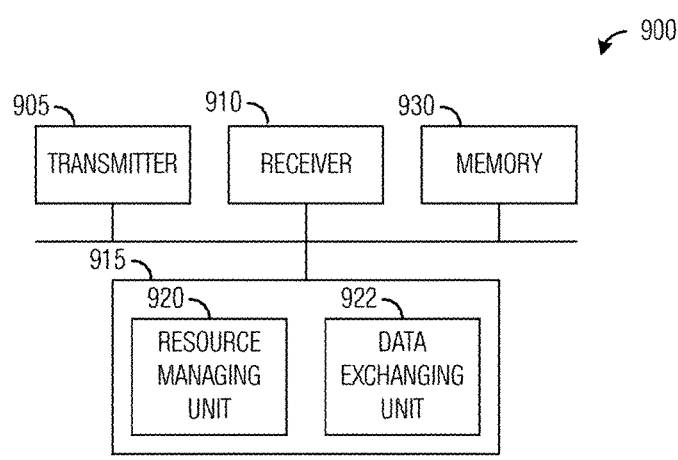
FIG. 9 illustrates an example second communications device according to example embodiments described herein.

FIG. 9 illustrates a second communications device 900. Communications device 900 may be an implementation of an access point, a communications controller, a base station, and the like. Communications device 900 may be used to implement various ones of the embodiments discussed herein. As shown in FIG. 9, a transmitter 905 is configured to transmit data. Communications device 900 also includes a receiver 910 that is configured to receive transmit beacon frames, (short) beacon frames, PRAW and/or RAW allocation information, and the like.

A resource managing unit 920 is configured to process PRAW resource assignments to determine when and/or where communications device 900 can exchange data. A data exchanging unit 922 is configured to exchange data with a communications controller. A memory 930 is configured to store PRAW resource reservations, PRAW parameters, PRAW indications, PRAW resource assignments, PRAW resource indications, data, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while resource managing unit 920, and data exchanging unit 922 may be software modules executing in a microprocessor (such as processor 915) or a custom circuit or a custom compiled logic array of a field programmable logic array. Resource managing unit 920, and data exchanging unit 922 may be modules stored in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method implemented by an access point, the method comprising:
broadcasting, by the access point, a beacon frame comprising a periodic restricted access window (PRAW) allocation message, each instance of the PRAW being an interval for accessing a channel by one or more stations, wherein the PRAW allocation message indicates a message type of the PRAW allocation message, and wherein the PRAW allocation message further indicates a period of the PRAW as an integer multiple of a short beacon interval;
transmitting, by the access point, an association response frame to a first station that includes information about a time slot of the PRAW that is assigned to the first station; and
transmitting or receiving, by the access point, data to or from the first station during the assigned time slot of the PRAW.

2. The method of claim 1, wherein the PRAW allocation message further indicates a duration of the PRAW and a time to a first time slot of the one or more time slots of the PRAW.

3. The method of claim 1, wherein the information about the time slot in the association response frame includes a start time of the time slot, a duration of the time slot, and a period of the time slot.

4. The method of claim 1, wherein the PRAW allocation message further indicates allowed stations permitted to exchange data during the PRAW.

5. The method of claim 1, wherein the PRAW allocation message is transmitted less frequently than every beacon frame.

6. The method of claim 1, wherein the time slot of the one or more time slots of the PRAW is allocated to a group of stations, wherein the group of stations includes the first station.

7. A method implemented by a station, the method comprising:
receiving, by the station, a beacon frame comprising a periodic restricted access window (PRAW) allocation message, each instance of the PRAW being an interval for accessing a channel by one or more stations, wherein the PRAW allocation message indicates a message type of the PRAW allocation message, and wherein the PRAW allocation message further indicates a period of the PRAW as an integer multiple of a short beacon interval; and
transmitting or receiving, by the station, data to or from an access point during a time slot of the PRAW upon determining that the station is in a list of allowed stations permitted to utilize the PRAW.

8. The method of claim 7, wherein the PRAW allocation message includes information about a duration of the PRAW and a time to a first time slot of one or more time slots of a PRAW.

9. The method of claim 7, wherein the PRAW allocation message further includes a number of time slots in the PRAW and durations of the time slots of the PRAW.

10. The method of claim 7, wherein the PRAW allocation message further indicates allowed long sleep stations permitted to exchange data during the PRAW.

11. The method of claim 7, wherein a list of allowed stations is transmitted in a short beacon frame.

12. The method of claim 7, wherein the PRAW allocation message is received at a greater period than a period of the list of allowed stations.

13. An access point comprising:
a memory storage comprising instructions; and
one or more processors in communication with the memory, wherein the one or more processors execute the instructions to:
broadcast a beacon frame comprising a periodic restricted access window (PRAW) allocation message, each instance of the PRAW being an interval for accessing a channel by one or more stations, wherein the PRAW allocation message indicates a message type of the PRAW allocation message, and wherein the PRAW allocation message further indicates a period of the PRAW as an integer multiple of a short beacon interval; and
transmit an association response frame to a first station that includes information about a time slot of the PRAW that is assigned to the first station; and
transmit or receive data to or from the first station during the assigned time slot of the PRAW.

14. The access point of claim 13, wherein the PRAW allocation message further indicates a duration of the PRAW and a time to a first time slot of the one or more time slots of the PRAW.

15. The access point of claim 13, wherein the information about the time slot of the PRAW in the association response frame includes a start time of the time slot of the PRAW, a duration of the time slot of the PRAW, and a period of the time slot of the PRAW.

16. The access point of claim 13, wherein the one or more processors execute the instructions to transmit the PRAW allocation message with the information about the assigned time slot to the first station.

17. A station comprising:
a memory storage comprising instructions; and
one or more processors in communication with the memory, wherein the one or more processors execute the instructions to:
receive a beacon frame comprising a periodic restricted access window (PRAW) allocation message, each instance of the PRAW being an interval for accessing a channel by one or more stations, wherein the PRAW allocation message indicates a message type of the PRAW allocation message, and wherein the PRAW allocation message further indicates a period of the PRAW as an integer multiple of a short beacon interval; and
transmit or receive data to or from an access point during a time slot of the PRAW upon determining that the station is in a list of allowed stations permitted to utilize the PRAW.

18. The station of claim 17, wherein the PRAW allocation message further indicates a duration of the PRAW and a time to a first time slot of one or more time slots of a PRAW of the PRAW.

19. The station of claim 17, wherein the PRAW allocation message further includes a number of time slots of the PRAW and durations of the time slots of the PRAW.

20. The station of claim 17, wherein the PRAW allocation message further includes a first indicator of allowed long sleep stations permitted to exchange data during the PRAW.

21. The station of claim 17, wherein the station is a regular station.

22. A method implemented by an access point in an Institute of Electrical and Electronics Engineers (IEEE) 802.11 compliant communications system, the method comprising:
periodically broadcasting, by the access point, a Beacon frame comprising a periodic restricted access window (PRAW) allocation message, each instance of the PRAW being an interval for accessing a channel by one or more stations, wherein the PRAW allocation message indicates a message type of the PRAW allocation message, and wherein the PRAW allocation message further indicates a period of the PRAW as an integer multiple of a short beacon interval;
transmitting, by the access point, a management frame to a first station, the management frame including information about a time slot of the PRAW that is assigned to the first station; and
transmitting or receiving, by the access point, data to or from the first station during the assigned time slot of the PRAW.

23. The method of claim 22, wherein the management frame is an association response frame.

24. The method of claim 22, wherein the PRAW allocation message includes at least one of a group identifier of the PRAW, a start time of the PRAW, a duration of the PRAW, or a start offset of the PRAW.

25. The method of claim 22, wherein the first station is a long sleep station.

* * * * *